(12) United States Patent
Toman

(10) Patent No.: US 9,200,736 B1
(45) Date of Patent: Dec. 1, 2015

(54) HOSE SPLICE INSTALLATION ASSEMBLY

(71) Applicant: Leo J. Toman, Flasher, ND (US)

(72) Inventor: Leo J. Toman, Flasher, ND (US)

( * ) Notice: Subject to any disclaimer, the term of this patent is extended or adjusted under 35 U.S.C. 154(b) by 0 days.

(21) Appl. No.: 14/567,515

(22) Filed: Dec. 11, 2014

Related U.S. Application Data

(60) Provisional application No. 61/915,255, filed on Dec. 12, 2013.

(51) Int. Cl.
*F16L 23/00* (2006.01)
*F16L 31/00* (2006.01)
*F16L 21/06* (2006.01)

(52) U.S. Cl.
CPC *F16L 31/00* (2013.01); *F16L 21/06* (2013.01)

(58) Field of Classification Search
USPC .................. 285/24, 27, 412, 414, 415, 15
See application file for complete search history.

(56) References Cited

U.S. PATENT DOCUMENTS

| 6,276,729 B1 * | 8/2001 | Sanwald et al. ............ 285/415 |
| 2006/0087121 A1 * | 4/2006 | Bradley ....................... 285/415 |

* cited by examiner

*Primary Examiner* — Aaron Dunwoody
(74) *Attorney, Agent, or Firm* — Steven M. Koehler; Westman, Champlin & Koehler, P.A.

(57) ABSTRACT

A hose splice installation assembly to join hose ends includes first and second clamp members. Each clamp member includes separable portions each with an inner surface configured to engage a portion of a hose end, and a fastening device configured to hold the portions fixedly on the hose end. A displacement mechanism removably couples the first and second clamp members together and is configured to move the clamp members towards each other.

14 Claims, 3 Drawing Sheets

HOSE SPLICE INSTALLATION ASSEMBLY

CROSS-REFERENCE TO RELATED APPLICATION

This application claims the benefit of U.S. Provisional Patent Application Ser. No. 61/915,255, filed Dec. 12, 2013, the content of which is hereby incorporated by reference in its entirety.

BACKGROUND

The discussion below is merely provided for general background information and is not intended to be used as an aid in determining the scope of the invention and/or the claimed subject matter.

There are many types of flexible hoses or pipes used in plumbing, irrigation and construction applications. Among the types of flexible hose that exist are Polyvinyl Chloride (PVC), Chlorinated Polyvinyl Chloride (CPVC), Acrylonitrile Butadiene Styrene (ABS), Cross-linked Polyethylene (PEX). The term "flexible hose" as used in this application may refer to these types of hoses or pipes or other types of hoses or pipes that may bend or deform when sufficient pressure is applied.

When joining multiple lengths of flexible hose together, one method used to connect the ends of the hoses together is with the use of a coupler (barbed) or splice inserted into each open end of each hose being joined and then forcing the hose ends together, which includes forcing the hose ends over the coupler.

Forcing the hose ends over the coupler may be an easy task if the hose is flexible enough; however, in many instances, it is a difficult task if the hose is not very flexible due to size of the hose, thickness of the hose, and/or the hose material.

SUMMARY

This Summary and the Abstract herein are provided to introduce a selection of concepts in a simplified form that are further described below in the Detailed Description. This Sum-mary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A hose splice installation assembly to join hose ends includes first and second clamp members. Each clamp member includes separable portions each with an inner surface configured to engage a portion of a hose end, and a fastening device configured to hold the portions fixedly on the hose end. A displacement mechanism removably couples the first and second clamp members together and is configured to move the clamp members towards each other.

DETAILED DESCRIPTION OF THE ILLUSTRATIVE EMBODIMENT

Figure 1:
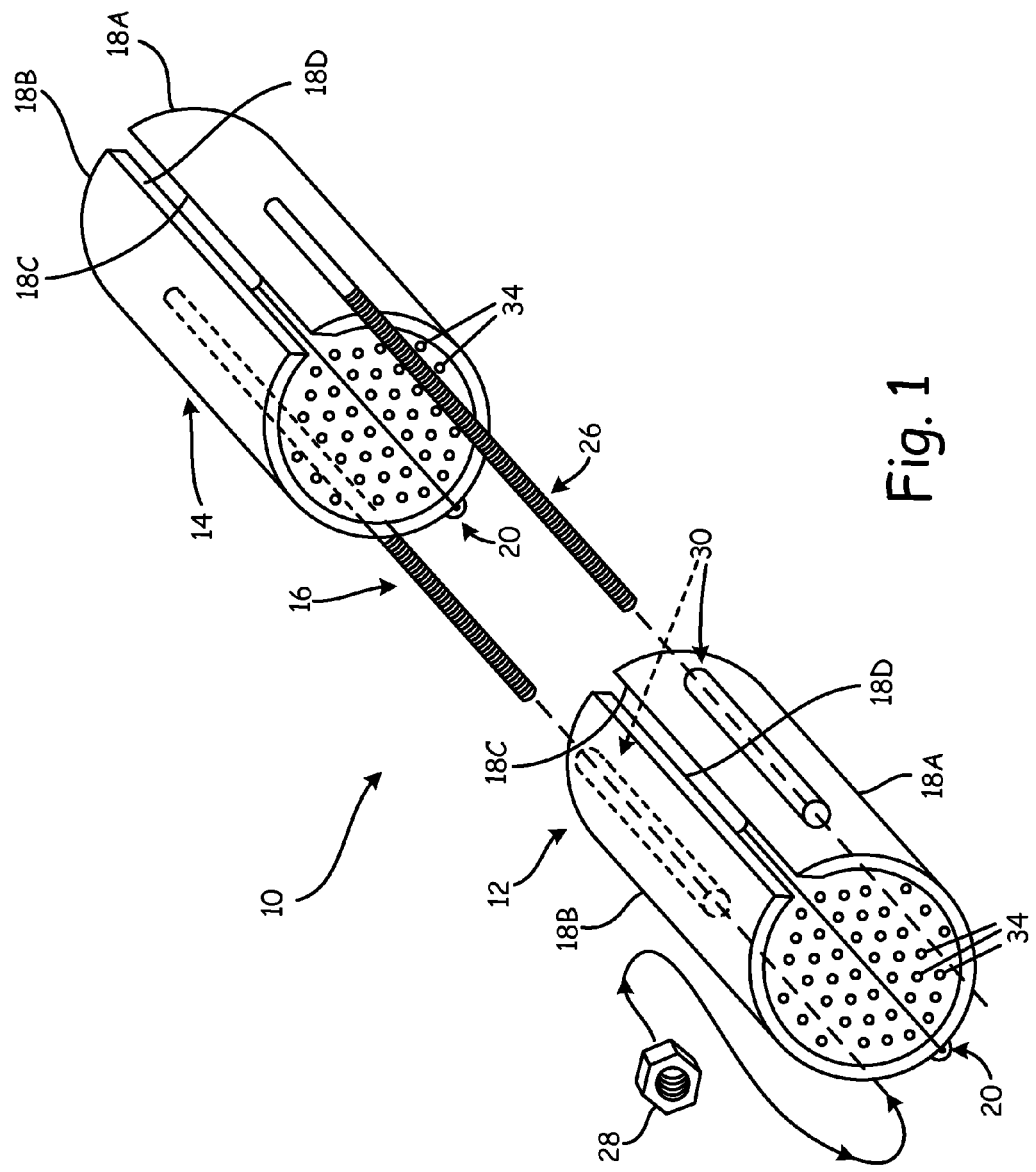
FIG. 1 is a schematic illustration of exemplary embodiment of a hose splice installation assembly.

An exemplary embodiment of a hose splice installation assembly 10 is illustrated schematically in FIG. 1. Generally, the installation assembly 10 includes first and second separable clamp members 12, 14 and a displacement mechanism 16 to draw the clamp members 12,14 towards each other, and over a splice fitting or coupler 17 (FIG. 3) such as a barbed coupler, after the clamp members 12,14 have been secured to hose ends 19, 21, (FIG. 3) respectively, to be spliced together.

Each clamp cylinder 12,14 includes at least two portions 18A, 18B that can be disposed adjacent each other to form an assembly over each of the hose ends 19, 21 and secured together. The inside diameters of the assemblies are slightly smaller than the outside diameter of the hose ends 19, 21 being spliced together. Since the inside diameter of the assemblies formed are slightly smaller than the outside diameter of the hose ends 19, 21 being joined, when the clamp members 12, 14 are forcibly closed and held in place by a suitable fastening device, the clamp members 12, 14 are fixedly secured to the respective hose ends 19, 21.

Although the inner surfaces of the clamp members 12, 14 are generally cylindrical so as to conform to cylindrical hose ends 19, 21, it should be noted that the inner surfaces of portions 18A, 18B together can be of any shape that the outer shape of the hose ends 19, 10 may be. In addition, although in the exemplary embodiment the outer shapes of the portions 18A, 18B are partial cylinders, this should not be considered a requirement since it is the shape of the inner surfaces of portions 18A, 18B that engage the hose ends 19, 21, and as such the outer surfaces of portions 18A, 18B can be non-cylindrical if desired.

Figure 3:
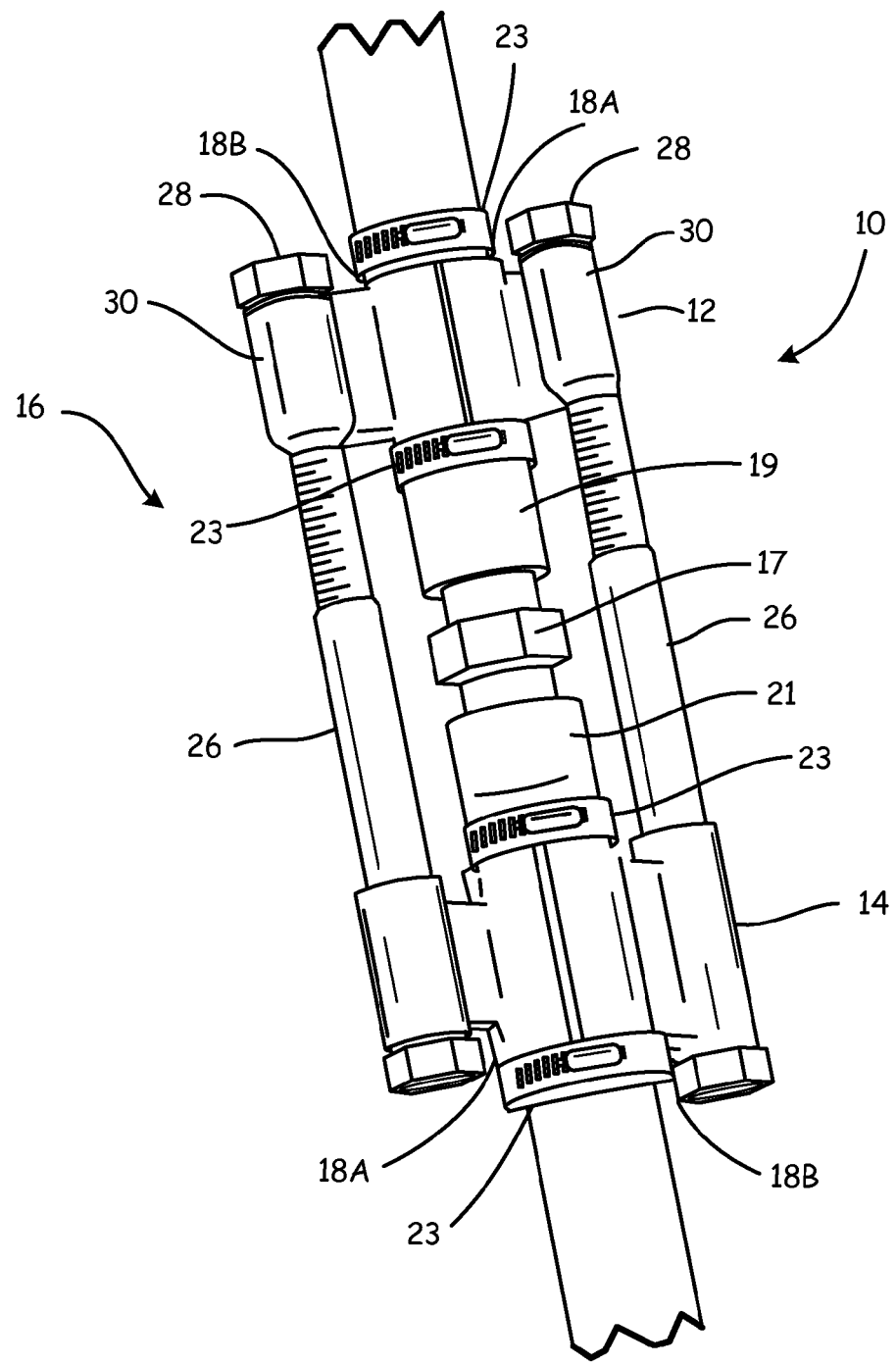
FIG. 3 is a perspective illustration of one embodiment of a hose splice installation assembly.

Various forms of suitable fastening devices can be used to secure the portions 18A, 18B together. For example and without limitation, the fastening devices can include camming mechanisms, levers, threaded fasteners, quick-release lever-action clamps and the like. In one embodiment as illustrated in FIG. 3, the portions 18A, 18B of each clamp member 12, 14 are joined permanently together with a hinge 20 allowing the cylinder portions 18A, 18B to remain fastened together when not clamped together by the fastening device. In this manner, the portions 18A, 18B remain aligned with respect to each other when disposed over the hose ends 19, 21.

In FIG. 3 the exemplary fastening devices are cylindrical hose clamp(s) 23 that encircle the portions 18A, 18B when actuated. In one embodiment, the portions 18A, 18B of each clamp member 12, 14 are held together by a hose clamp 23 at each end of the clamp member 12, 14. However, other fastening devices that do not encircle the portions 18A, 18B can be used such as so as to pull the spaced apart edges 18C, 18D of the portions 18A, 18B, respectively, together.

The displacement mechanism 16 couples the first and second clamp members 12, 14 together when the clamp members 12, 14 are secured to each of the hose ends 19, 21, and moves the clamp members 12, 14 towards each other when the displacement mechanism 16 is actuated. The displacement mechanism 16 can include without limitation camming mechanisms, levers, threaded fasteners and the like.

In the embodiment illustrated, the clamp members comprise a "male clamp cylinder" ("MCC") 14 and a "female clamp cylinder" (FCC) 12 denoted by components of the displacement mechanism 16. In the embodiment illustrated, the displacement mechanism 16 comprises at least one threaded fastener comprising a threaded bolt 26 and a nut 28 arranged so as to connect the clamp members 12,14. In the embodiment illustrated, two spaced apart bolts 26 are provided on the MCC 14 approximately 180 degrees from each other. The bolts 26 are fixedly secured to the associated portions 18A, 18B and insertable into sleeves 30 fixed to the portions 18A, 18B of the FCC 12. The lengths of the threaded bolts 26, their location on the portions 18A, 18B of the MCC 14 and the lengths and location of the sleeves 30 on the FCC 12 are arranged to allow the bolts 26 to be inserted through the sleeves 30 and extend therethrough when the the coupler 17 is disposed between the hose ends 19,21. The nuts 28 can then be threaded upon the bolts 26 and advanced to forcibly draw the clamp members 12, 14 together. In an alternative embodiment, each of the clamp members 12, 14 can comprise FCC clamp members with separate threaded bolts inserted through aligned sleeves of both of the FCC clamp members.

If desired, inner surfaces of the portions 18A, 18B can include non-smooth surface textures such as raised dimples 34 or other projections. In such an embodiment, when the portions 18A, 18B are forcibly closed over the hose end, the dimples, projections or other non-smooth surface texture will press into/on the flexible hose material, increase friction and thus provide a more secure connection to the hose end. In addition, or in the alternative, the inner surfaces of the portions 18A, 18B can include other surface treatments to increase friction such as but not limited to a sandpaper-like coating, an adhesive and/or a compressible material such as a rubber-like coating.

In another embodiment, the hinge 20 may not be a type of hinge that permanently joins portions 18A, 18B together, but rather can comprise hinge components such as cooperative pin(s) and sleeve(s) secured to portions 18A, 18B that operate as a hinge when the pin(s) is inserted in the corresponding sleeve(s), but allow the pin(s) to be removed from the sleeve (s) and thus the portions 18A, 18B be separable. In yet another embodiment, the use of hinges 20 may be excluded with the hinge 20 being replaced by additional cam levers or other means to forcibly close the portions 18A, 18B together on both sides of the portions 18A, 18B (the side where the hinge 20 is in FIG. 1 as well as the side directly opposite where the hinge 20 is in FIG. 1).

Figure 2:
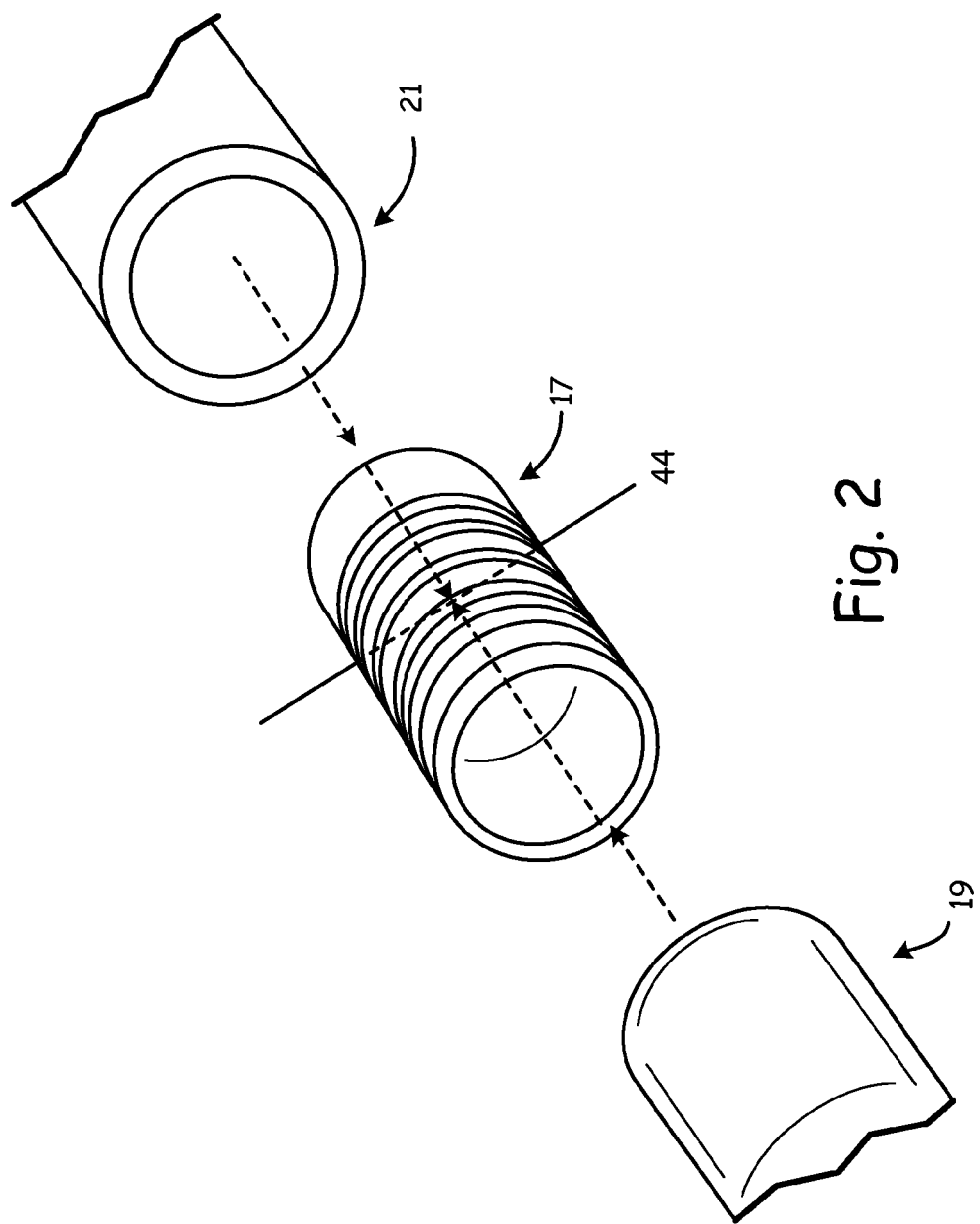
FIG. 2 is a schematic illustration of two hose ends and a barbed coupler.

FIG. 2 shows the two hose ends 19, 21 and the coupler 17 in the orientation prior to fastening. As indicated in FIG. 2, the hose ends 19, 21 are drawn over the coupler 17 and toward the center portion 44 of the coupler 17, resulting in the joining of the two hose ends 19, 21.

Referring also to FIG. 3, when joining hose ends 19, 21 together, the MCC 14 is opened with the hinge 20 and portions 18A, 18B are placed over the hose end 19. Likewise, the FCC 12 is opened with the hinge 20 and portions 18A, 18B are placed over the other hose end 21, the coupler 17 being disposed between, and commonly engaging each of the hose ends 19,21.

Nuts 28 are threaded onto the ends of each threaded bolt 26 after the bolts 26 have been inserted into each respective sleeve 30. Each nut 28 is turned onto each threaded bolt 26 a sufficient number of turns to hold the threaded bolt 28 in place so that it will not slip out of the sleeve 30 while the MCC 14 and FCC 12 are positioned in place and secured to the hose ends 19, 21.

The portions 18A, 18B of each of the MCC 14 and FCC are folded together using their respective hinges 20 over each associated hose end 19, 20 and the fastening device, herein hose clamps 23, are tightened so as to secure the MCC 14 and FCC 12 to each respective hose end 19, 21.

With the MCC 14 and FCC 12 secured to each respective hose end and the coupler 17 in between the MCC 14 and FCC 12 and in position to be forced into each open hose end 19,21, the process of forcing the hose ends 19,21 together over the coupler 17 can begin. The nuts 28 are rotated using a device such as a wrench (not shown) and, as the nuts 28 are rotated, the threaded bolts 28 are pulled through the sleeves 30, thereby bringing the MCC 14 and FCC 12, and the hose ends 19, 21 thereattached, closer together and over the coupler 17.

Once the hose ends 19,21 have been sufficiently pulled together over the coupler 17, the nuts 28 are rotated in the opposite direction and removed from the threaded bolts 28. The fastening device used to secure the portions 18A, 18B of each of the MCC 14 and FCC 12 can be deactivated to allow the portions 18A, 18B to separate sufficiently to be removed from the hose ends 19,21. If each of the hose clamps 23 are loosened, each hose clamp can then be slid onto the adjacent portion of hose, thereby allowing the assembly as a whole to be removed, i.e. while the clamp members 12, 14 remain connected together with the displacement mechanism 16.

At this point, the two hose ends 19, 21 have been forced together over the coupler 17. The hose ends 19, 21 may be further secured to the coupler 17 by the use of a round steel band hose clamps (such as the clamps 23 conveniently used prior as the fastening device for the clamp members 12, 14 but now remaining on the connected hose ends 19, 21), or other mechanisms that will be left in place.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. A hose splice installation assembly to join hose ends, the assembly comprising:
    first and second clamp members, each clamp member comprising:
        separable portions joined together with a hinge configured to allow edges of the separable portions remote from the hinge to separate in an open position and allow a hose end to be inserted between the separable portions, each separable portion having an inner surface configured to engage a portion of the hose end when the edges are positioned adjacent each other in a closed position, the separable portions configured to together substantially encircle each respective hose end in the closed position; and
        a fastening device configured to forcibly bring the edges together and hold the separable portions fixedly on the hose end in the closed position; and
    a displacement mechanism removably couples the first and second clamp members together and is configured to move the clamp members towards each other.

2. The hose splice installation assembly of claim 1 wherein the displacement mechanism comprises at least one threaded bolt and nut wherein at least one clamp member includes a sleeve configured to receive the threaded bolt therethrough.

3. The hose splice installation assembly of claim 2 wherein the threaded bolt is fixedly secured to one of the clamp members.

4. The hose splice installation assembly of claim 1 wherein each hinge is permanently joined to associated separable portions.

5. The hose splice installation assembly of claim 1 wherein the displacement mechanism comprises two threaded bolts provided on the first clamp member, the threaded bolts being approximately 180 degrees away from each other.

6. The hose splice installation assembly of claim 1 wherein the inner surface of each separable portion is partial cylinder.

7. The hose splice installation assembly of claim 6 wherein the outer surface of each separable portion is a partial cylinder.

8. The hose splice installation assembly of claim 7 wherein each fastening device is a hose clamp.

9. The hose splice installation assembly of claim 1 wherein each fastening device encircles associated separable portions in the closed position.

10. The hose splice installation assembly 5 and further comprising two sleeves secured to the second clamp member approximately 180 degrees away from each other, each of the sleeves configured to receive one of the threaded bolts.

11. The hose splice installation assembly of claim 10 wherein the hinges are axially aligned with each other when the threaded bolts are received in the sleeves.

12. The hose splice installation assembly of claim 11 wherein threaded bolts are fixedly secured to the first clamp member.

13. The hose splice installation assembly of claim 12 wherein each fastening device encircles associated separable portions in the closed position.

14. The hose splice installation assembly of claim 13 wherein each fastening device is a hose clamp configured to selectively release each associated pair of separable portions and be removable from each respective clamp member allowing each respective clamp member to be removed from each respective hose end, while each fastening device remains encircling each respective hose end, each fastening device being configured to engage and apply a force about the outer surface of the hose end to secure the hose end to an end of a coupler when each respective clamp member has been removed.

\* \* \* \* \*